United States Patent [19]

Perumal, Jr. et al.

[11] Patent Number: 5,710,827
[45] Date of Patent: Jan. 20, 1998

[54] HALFTONE DITHER CELL WITH INTEGRATED PREFERRED COLOR MATCHING

[75] Inventors: Alexander Perumal, Jr., Poway; Qian Lin, Santa Clara, both of Calif.

[73] Assignee: Hewlett-Packard Company, Palo Alto, Calif.

[21] Appl. No.: 558,560

[22] Filed: Oct. 31, 1995

Related U.S. Application Data

[63] Continuation-in-part of Ser. No. 308,321, Sep. 19, 1994.
[51] Int. Cl.$^6$ .............................. G03F 3/08; H04N 1/46; H04N 1/40
[52] U.S. Cl. .............. 382/167; 382/168; 382/169; 358/534; 358/535; 358/456; 358/457; 358/455
[58] Field of Search .............................. 358/502, 503, 358/518, 522, 534, 535, 456, 457, 455, 458, 448, 536, 465, 466; 382/167, 168, 169

[56] References Cited

U.S. PATENT DOCUMENTS

| | | | |
|---|---|---|---|
| 5,323,241 | 6/1994 | Yonezawa | 358/298 |
| 5,535,020 | 7/1996 | Ulichney | 358/457 |
| 5,539,843 | 7/1996 | Murakami et al. | 358/457 |

*Primary Examiner*—Kim Vu
*Assistant Examiner*—Tia M. Harris
*Attorney, Agent, or Firm*—Dennis G. Stenstrom

[57] ABSTRACT

Methods and apparatus generate, and use in printing, a dither matrix that incorporates a vivid-response function, that follows a generally S-shaped response curve. Printing with this pregenerated dither cell is just as fast as with a conventional cell, but printed color has a slightly exaggerated vividness, more pleasing to most users than more-accurately reproduced color. Color printed with this curve alone, however, is found unsatisfactorily dark; the invention also encompasses including in the overall response another function to lighten the colors—particularly at the low end of the brightness range. We define both functions as so-called "gamma functions", but with different arguments and exponents, and construct the S-shaped curve as two separate sections blended at a generally central point. Preferably the argument of the first (low-brightness) section is an expression that is proportional to an input color signal; the function raises this argument to a power greater than unity (ideally 1.6). The second (high-brightness) section of the first function is essentially a mirror image of the first, flipped over first upward and then to the "right" (i.e., in both steps toward higher brightness); and is defined by an equation closely analogous to the first but measuring the signal from the high end of the input range and subtracting the curve value from the maximum output. The second gamma function has as its argument the output value of the first, and an exponent smaller than one—ideally 0.6.

18 Claims, 12 Drawing Sheets

HALFTONE DITHER CELL WITH INTEGRATED PREFERRED COLOR MATCHING

CROSS-REFERENCE TO RELATED APPLICATIONS

This is a continuation-in-part of SYSTEM AND METHOD FOR GENERATING CALIBRATED DITHER MATRICES, by Qian Lin, Ser. No. 08/308,321, filed Sep. 19, 1994; and is related to the following U.S. patents and and commonly assigned U.S. patent applications: U.S. Pat. No. 5,317,418, HALFTONE IMAGES USING SPECIAL FILTERS, by Qian Lin; application Ser. No. 08/057,244, now U.S. Pat. No. 5,469,515 HALFTONE IMAGES USING PRINTED SYMBOLS MODELLING, by Qian Lin, filed May 3, 1993; U.S. Pat. No. 5,377,024, APPARATUS FOR FORMING COLOR IMAGES USING A HUE-PLUS-GRAY COLOR MODEL by PAUL H. DILLINGER; application Ser. No. 08/187,935, now abandoned (May 10, 1995) COLOR DIGITAL HALFTONING USING BLACK AND SECONDARY COLOR REPLACEMENT, by Alexander Perumal, Jr., et al., filed Jan. 27, 1994; application Ser. No. 08/189,541, U.S. Pat. No. 5,473,446 COLOR DIGITAL HALFTONING USING BLACK AND SECONDARY COLOR REPLACEMENT AND COLOR VECTOR DITHERING, by Alexander Perumal, Jr., et al., filed Jan. 27, 1994; U.S. Pat. No. 5,402,245, BI-LEVEL DIGITAL COLOR PRINTER SYSTEM EXHIBITING IMPROVED UNDER-COLOR REMOVAL AND ERROR DIFFUSION PROCEDURES by Gary Dispoto, et al.; application Ser. No. 08/189,006, ADAPTIVE COLOR RENDERING BY AN INKJET PRINTER BASED ON OBJECT TYPE by Thomas G. Smith, et al., filed Jan. 27, 1994; application Ser. No. 08/187,933, abandoned Apr. 12, 1996 COLOR HALFTONING OPTIONS INFLUENCED BY PRINT MODE SETTING, by Kirt A. Winter, et al., filed Jan. 27, 1994; application Ser. No. 08/187,942, U.S. Pat. No. 5,579,446 MANUAL/AUTOMATIC USER OPTION FOR COLOR PRINTING OF DIFFERENT TYPES OF OBJECTS, by Sachin S. Naik, et al., filed Jan. 27, 1994; and application Ser. No. 08/188,618, AUTOMATED OPTIMIZATION OF HARDCOPY OUTPUT by Steven O. Miller, et al., filed Jan. 27, 1994. All these documents are incorporated herein by reference.

FIELD OF THE INVENTION

This invention relates to digital color printers which produce binary level color dots to create a full-color representation of an image and, more particularly, to a digital color printer performing color digital halftoning using dither matrices with built-in preferred color matching.

BACKGROUND OF THE INVENTION

Currently, both inkjet printers and laser printers are capable of producing full color images with high quality and precision. Such color printers are controlled by a printer driver program which provides an interface between an application program running on a host processor and the printer. Normally, a user creates a document using an application on the host computer and then calls for initiation of the printer driver program. In response to the user's instituting a print command, the host computer transmits a series of page descriptions to the printer driver. The printer driver then proceeds to use built-in functions to rasterize the page description into a pixel map of a predefined resolution (e.g. 300 dots per inch, 600 dots per inch, etc.). The printer driver must also adjust the printed colors to match the screen colors as closely as possible.

Personal computers (PCs) use eight-bit values to designate each primary color. To produce secondary colors, a PC uses combinations of the three eight-bit values to control the computer's display device (e.g. a color CRT). A twenty-four-bit value can represent $2^{24}$ different color values, which color values can be reproduced by appropriate control of the CRTs color-associated electron guns. When a color printer is called upon to accurately reproduce that many color values, extensive color processing is required.

Thus, in order to reproduce a received color value, a color printer must convert the color value into a color command that is recognized by the printer engine. It was early realized that it was impractical to produce a color-table map that mapped all $2^{24}$ possible PC-generated input colors to printer-engine color codes.

Each pixel in the pixel map comprises, for instance, three eight-bit values corresponding to red, green and blue values derived from a display device in the host processor. The printer driver must adjust the color values in accordance with a predetermined calibration function so as to assure that the to-be-printed colors will appear the same as, or related in a desired manner to, the colors displayed on the display device.

This is performed by a color management or mapping system that assures the colors produced by one product (a printer, scanner, monitor, film recorder, etc.) match or are suitably related to those produced on others. Color management systems typically have two components, "profiles" of individual color products that specify the color capabilities of the device, and software that runs on a host computer that uses this information to ensure that the colors produced by one product are thus related to those produced by another. In cases where a particular color is not within the color gamut of a target device (i.e. the target device simply is incapable of reproducing the color), the color management software must provide the closest possible or otherwise-related match. Device-independent color is a term describing a computer system capable of reproducing a color accurately on any attached color device (printer, monitor, scanner, etc.). Device-independent color is usually implemented by developing "device profiles" that describe the colors a product can produce and by developing a color-matching engine that uses the profiles to convert color data to assure a match between devices.

RGB is a color space that uses as its primary colors red, green, and blue. These three colors are the primary "additive" colors. In devices that use projected light to produce an image (for example, televisions or computer monitors), a broad gamut of colors can be reproduced using red, green, and blue. Red and green combine to form yellow, red and blue to form magenta, green and blue to form cyan, and all three to form white. Other shades can be produced by combining different mounts of the three primary colors.

CMYK is a color space that uses as its primary colors cyan, magenta, yellow and black. These four colors are the primary "subtractive" colors; that is, when printed on paper, the CMYK colors subtract some colors while reflecting others. Cyan and magenta combine to form blue, cyan and yellow to form green, magenta and yellow to form red, and in theory, all three to form black; however, it is sometimes difficult to get a satisfying black using a given set of cyan, magenta, and yellow pigments, and therefore many reflective color-based products add a "true" black color, hence CMYK, not CMY. (To avoid confusion with blue, the letter K is used to represent black). The CMYK color set is sometimes called "process color."

In printing, the printer uses the three subtractive primary colors. In each, one of the three additive colors has been subtracted from the white light. When red is subtracted, green and blue are left which combine to form the color cyan. When green is subtracted, red and blue are left which combine to form the color magenta. When blue is subtracted, red and green light combine to form the color yellow. The printer's subtractive primary colors are cyan, magenta, and yellow. In principle the overprinting of all three in solid images yields black. The combination is black because each has subtracted one of the three additive primary components of white light and the complete absence of light is black.

Thus, the printer driver must convert the red, green and blue values to cyan (C), magenta (M), and yellow (Y) values. As a result, each pixel is then represented by three eight-bit values which identify the corresponding levels of C,M,Y that will be used to subsequently control the print mechanism. An additional eight-bit value is supplied for a pixel black (K) dot to be applied at the pixel location.

Color printers can print one of eight colors at a particular pixel (red, green, blue, cyan, magenta, yellow, black, or white). However, the computer can request any one of sixteen million colors. Therefore, it is necessary to produce a translation between twenty-four-bit pixels (sixteen million colors) and three-bit pixels (eight colors). This translation is called digital halftoning. It is an integral part of color printing.

Halftoning refers to any process that creates the illusion of continuous-tone images by judicious arrangement of binary picture elements, such as ink drops in the case of inkjet printers. Thus, halftoning is printing the simulation of a continuous-tone image, such as a shaded drawing or a photograph, with groups or cells of color or black dots. The dots are placed in such a way that they appear to the human eye to be a single color. Digital halftoning is sometimes called spatial dithering.

Printing presses and most printers use halftoning to render images. On printing presses, different-size dots can be used to produce different shades of gray or color. Most color printers are binary in nature, in that they either apply a full color dot or no color dot to a pixel location. Such color printers do not employ a control mechanism to enable adjustment of the intensity of a particularly applied color dot. In binary printers, different patterns of identical dots are used to produce halftone images. As a result, a printer driver for a binary color printer employs a color digital halftoning process which reduces the twenty-four-bit color information to three bits per pixel print position (one bit for each of the C,Y, and M color planes).

Dithering can be used to reproduce gray shades using only black ink, or a fuller gamut of color using only the process colors (cyan, magenta, yellow, black). For example, to produce green, a color printer lays down patterns of small yellow and cyan dots that appear to the eye to be green. There are many halftoning techniques, each with its own method for laying down dots. Examples include pattern dithering and error diffusion. Pattern dithering uses a library of set patterns to reproduce a color (in color printing) or a gray shade (in monochrome printing). Pattern dithering can be characterized as ordered or random. Ordered dithers generally fall into one of two broad classes, dispersed, or clustered.

In dithering, a lot of work has been done to create the ideal "dither cell". This effort has been put into developing dither cells that have random or "blue noise" characteristics. Such "supersmooth" dither cells produce an image that appears almost as good as error diffused, but with the speed performance of a dither. See U.S. patent applications Ser. No. 08/187,935, COLOR DIGITAL HALFTONING USING BLACK AND SECONDARY COLOR REPLACEMENT, by Alexander Perumal, Jr., et al., filed Jan. 27, 1994; Ser. No. 08/189,541, COLOR DIGITAL HALFTONING USING BLACK AND SECONDARY COLOR REPLACEMENT AND COLOR VECTOR DITHERING, by Alexander Perumal, Jr., et al., filed on Jan. 27, 1994; Ser. No. 08/308,321, SYSTEM AND METHOD FOR GENERATING CALIBRATED DITHER MATRICES, by Qian Lin, filed Sep. 19, 1994; and Ser. No. 08/057,244, HALFTONE IMAGES USING PRINTED SYMBOLS MODELLING, by Qian Lin, filed May 3, 1993; and also U.S. Pat. No. 5,317,418, HALFTONE IMAGES USING SPECIAL FILTERS.

Dithers are implemented by use of a dither cell or dither matrix or threshold array, also called a mask, a two-dimensional matrix of thresholds. Pixel values are compared to corresponding entries in the dither cell to determine whether they should be turned on or off. In this way a shade of red for example can be converted to full red or no red. Many different approaches exist that vary the size of the cell and the distribution of the thresholds. Thus halftoning is accomplished by a simple pointwise comparison of the input image against a predetermined threshold array or mask. For every point or pixel in the input image, depending on which point value is larger of the image or the mask, either a one or zero, respectively, is placed at the corresponding location in the binary output image.

This matrix is mapped over the continuous-tone image. For an image that is larger than the space occupied by the dither matrix, the matrix replicates itself to cover the entire image.

The elements of the dither matrix are termed threshold values. The distribution of threshold values in a dither matrix determines the tonal response of the dither matrix. A goal of halftone printer design is accurate and pleasing reproduction of continuous-tone images. To achieve these goals, the dither matrix must be calibrated, i.e., the threshold values which makes up the dither matrix must be adjusted. One goal of calibration is to ensure that when continuous-tone images of particular darkness are printed on a halftone printer they have the same darkness as the original images, respectively. Analogous goals exist for other output devices, such as monitors.

Pattern dithering in general benefits from ease of implementation. Pattern dithering is computationally fast but does not offer the best possible reproduction quality. Error diffusion is a technique for laying down dots of the three process colors to produce the full spectrum of color. Error-diffusion techniques use complex algorithms to lay down dots of color in a random rather than a repeated pattern, which improves the quality of the image. Error diffusion makes the best approximation it can for a given pixel, calculates how far that approximation is from the ideal and propagates this "error" to neighboring pixels. In this way a given pixel may not be particularly accurate, but the area is. In general, error diffusion generates much better print quality than dithering; however, typically, intense calculation is required to create the random pattern, and therefore printing images using error diffusion is much slower than using pattern dithering.

Thus, halftoning algorithms can generally be evaluated in terms of speed of execution and resulting print quality. Often a tradeoff needs to be made between an algorithm that is fast, but does not produce optimum print quality versus an alternative approach with better print quality that takes longer. So the problem each halftoning technique is trying to address is how to quickly produce a high print-quality image.

Traditional methods of color matching involve 3×3 matrix transformations of colors from the device-specific color space of the input source (e.g., a computer monitor or color scanner) into a device-independent color space (e.g. CIE XYZ). The device-independent color is then transformed into the device-specific color space of the output device (e.g., a printer or computer monitor). Normally in the case of a color printer, a three-dimensional color correction is done with a large color-lookup table instead of 3×3 matrix transformations. The matrix transformations alone do not produce an adequate match to the printer. This is because color reproduction is fundamentally a subtractive color process on a hardcopy device and ink-media interactions are very nonlinear in comparison to the additive color process of a scanner or monitor.

The size of a complete three-dimensional (256 values per dimension) color-lookup table, however, is prohibitive. Therefore, the color space is subsampled and a smaller color-lookup table and interpolation are used to produce the desired results. This color-matching procedure achieves sufficient accuracy, but is very computation-intensive. For example, when using PostScript™ some printers take fifty percent longer to process and print an 8×10 color image when using color matching versus when color matching is not used. Moreover, customer surveys regarding color matching have led to the discovery that most users are more interested in attractive, vivid, color output than they are in precise colorimetric color matching.

Prior solutions for accurate color matching as described above have been used in existing color printers, but their big disadvantages are poor performance and a less-than-optimal color match. Thus, there is a continuing need to improve the clarity and vividness of color images produced by binary color printers without decreasing speed.

It is therefore advantageous to provide a system and a method for generating dither matrices with vivid color matching embedded during the dither-matrix generation process.

It is further advantageous to have a method and a system for generating dither matrices with embedded vivid color matching without reducing the number of available tone levels.

It is also advantageous to have a dither matrix with embedded vivid color-matching system and method that permits an output device to map the number of distinguishable tone levels in the dynamic range of the source into the same number of levels in its own dynamic range.

Furthermore, it is advantageous to provide a method and a system for enabling free tuning of the dither matrix to a specific halftone imaging device.

SUMMARY OF THE INVENTION

The present invention provides an improved method of color matching by utilizing a vivid-response curve that produces clear and vivid output. Moreover, there is no decrease in throughput because the color transformations are embedded in the dither cell. The present invention further provides a system and a method for generating a dither matrix calibrated to a desired vivid color response. The present invention provides a halftoning technique that produces high-quality vivid color output with no decrease in throughput because the color transformations are embedded in the dither cell.

Other aspects and advantages of the present invention will become apparent from the following detailed description, taken in conjunction with the accompanying drawings, illustrating by way of example the principles of the invention, in which:

DETAILED DESCRIPTION OF THE PREFERRED EMBODIMENT

Color printers typically can print one of eight colors at a particular pixel (red, green, blue, cyan, magenta, yellow, black, or white). However, the computer can request any one of sixteen million colors. Shades of 0–225 for Red, Green, and Blue produce sixteen million combinations. Therefore, it is necessary to produce a translation between twenty-four-bit pixels (sixteen million colors) and three-bit pixels (eight colors). As mentioned above, this translation is called halftoning.

Dither cells are customarily placed initially in a position where the upper left corner of the cell corresponds to the upper left corner of the image being rendered. This placement causes each dither cell location to now correspond to specific pixels in the image area covered by the dither cell. The color printed by the halftoning process is determined by the comparison of the color value of the pixel, and the value of the dither cell that corresponds to that pixel.

Rendering of that area of the image corresponding to the area covered by the dither cells is performed. The dither cell is now repositioned over the image by shifting the cell to the right by the distance which corresponds to the width of the cell. This new placement of the cell covers a new image area immediately adjacent to the area of the image previously covered. This part of the image may then be rendered. The dither cell is moved again and again until the right hand side of the image is reached. The process continues by returning the dither cell to the left side of the image and shifting it downward by the amount which corresponds to the height of the cell. The process is then repeated until the entire area of the image has been covered and rendered.

Figure 1:
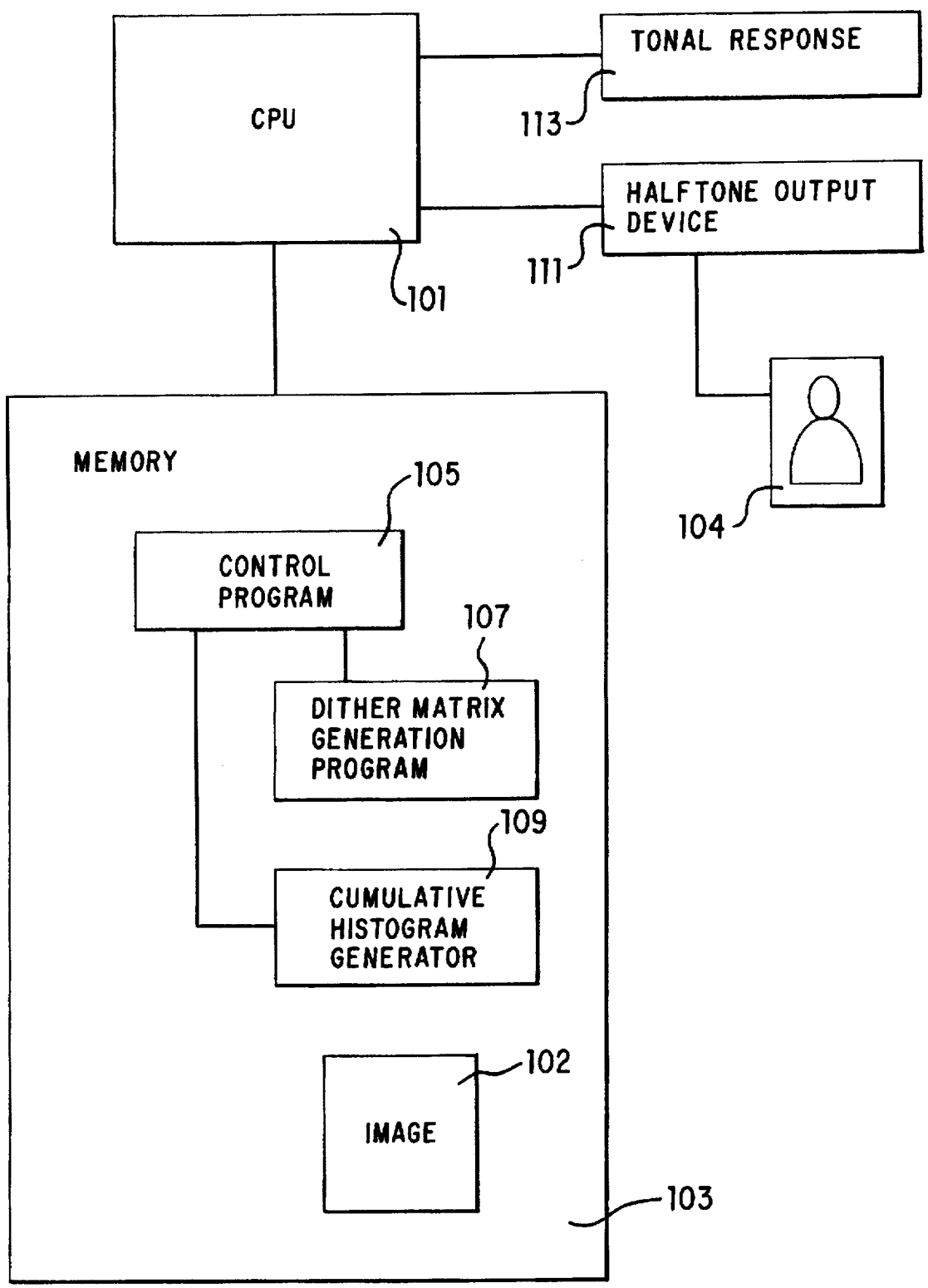
FIG. 1 is a block diagram of a computer system for generating calibrated dither matrices according to the present invention.

FIG. 1 is a block diagram of a computer system 100 for generating calibrated dither matrices according to the present invention. A Central Processing Unit (CPU) 101 is connected to a computer memory 103. The computer memory 103 contains a control program 105, a dither matrix generation program 107, and a cumulative histogram generator 109. The CPU 101 may also be attached to a plurality of secondary storage devices (not shown). The programs 105, 107 and 109 may be stored on these secondary storage devices and loaded into the computer memory prior to the execution of these programs.

The control program 105 is logically connected to the dither matrix generation program 107 and cumulative histogram generator 109.

The CPU 101 is further connected to a halftone output device 111. The halftone output device 111 is operable to output continuous-tone images using a dither matrix generated by the dither matrix generator 107. The halftone output device 111 may be either a black-and-white or a color halftone output device.

Figure 2:
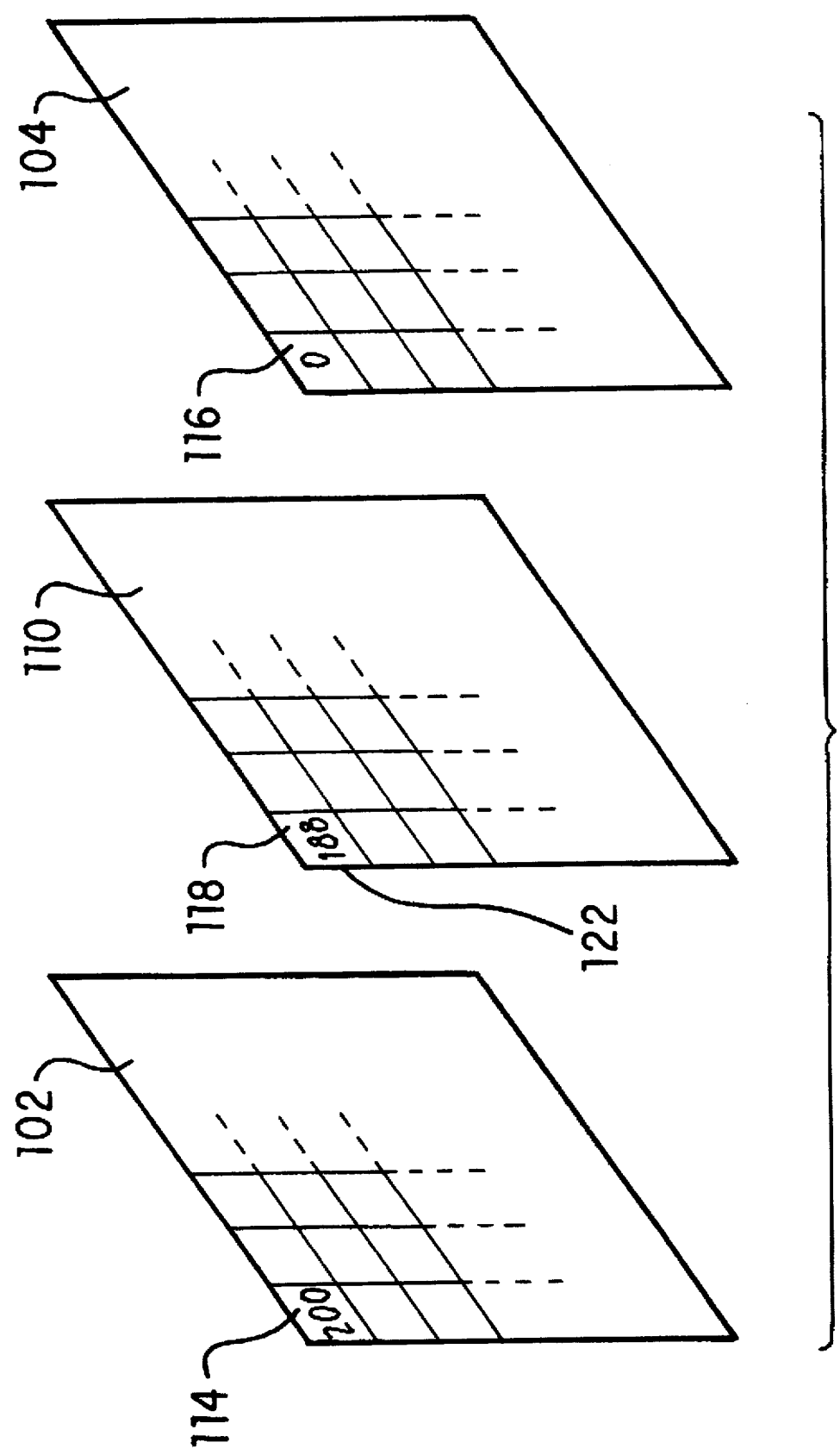
FIG. 2 shows a preferred dither matrix used by the computer system of FIG. 1.

In operation, the computer system 100 converts a gray-scale image 102, stored, for example, in the computer memory 103, into a halftone image 104. The halftone image is represented by symbols output on the halftone output device 111. FIG. 2 shows a preferred dither matrix 110 used by the computer system 100 to generate the halftone image 104. The halftone image 104, the continuous-tone image 102, and the dither matrix 110, each occupy an area; for example, the dither matrix occupies an area 112. The three areas are substantially equal to each other. The size of the dither matrix is small, and depends on the resolution of the output device. A dither matrix is a dimensionless array of integers. The size of the dither matrix is defined in terms of the numbers of rows and columns it contains. So long as the numbers of rows and columns of the dither matrix are smaller than the numbers of rows and columns in the image, the matrix will be replicated.

Both the halftone image 104 and the continuous-tone image 102 have many pixels such as the continuous-tone image pixel 114 and the halftone image pixel 116. Each pixel has a value; for example, the continuous-tone image pixel 114 has a value of 200 and the halftone image pixel 116 has a value of 0. The dither matrix 110 has many elements; for example the element 118. In one preferred embodiment, the matrix has 128 rows by 128 columns of elements. Each element has a value and occupies a position in the dither matrix area; for example, the element 118 has a value 188, and occupies a position 122.

Both the continuous-tone and the halftone image may be in black-and-white or color. One preferred way to represent color is to have three components or symbols for each pixel, each component or symbol having a different color.

The method of generating the halftone image includes the steps of comparing the value of each pixel of the continuous-tone image with the value of an element in the dither matrix. Based on the result of the comparison, the value of a corresponding pixel of the halftone image is determined. For example, the value 200 of the continuous-tone image pixel 114 is compared to the value 188 of the element 118. Based on the comparison, the value of the pixel 116 is determined to be a minimum value, such as 0, which means that a symbol will not be output at that pixel.

The present invention has two key components: (1) creation and use of a vivid-response curve that produces clear and vivid output, and (2) embedding of the color transformations in the dither cell. Of course it also encompasses printing with the completed cell, as indicated elsewhere in this document.

Figure 3:
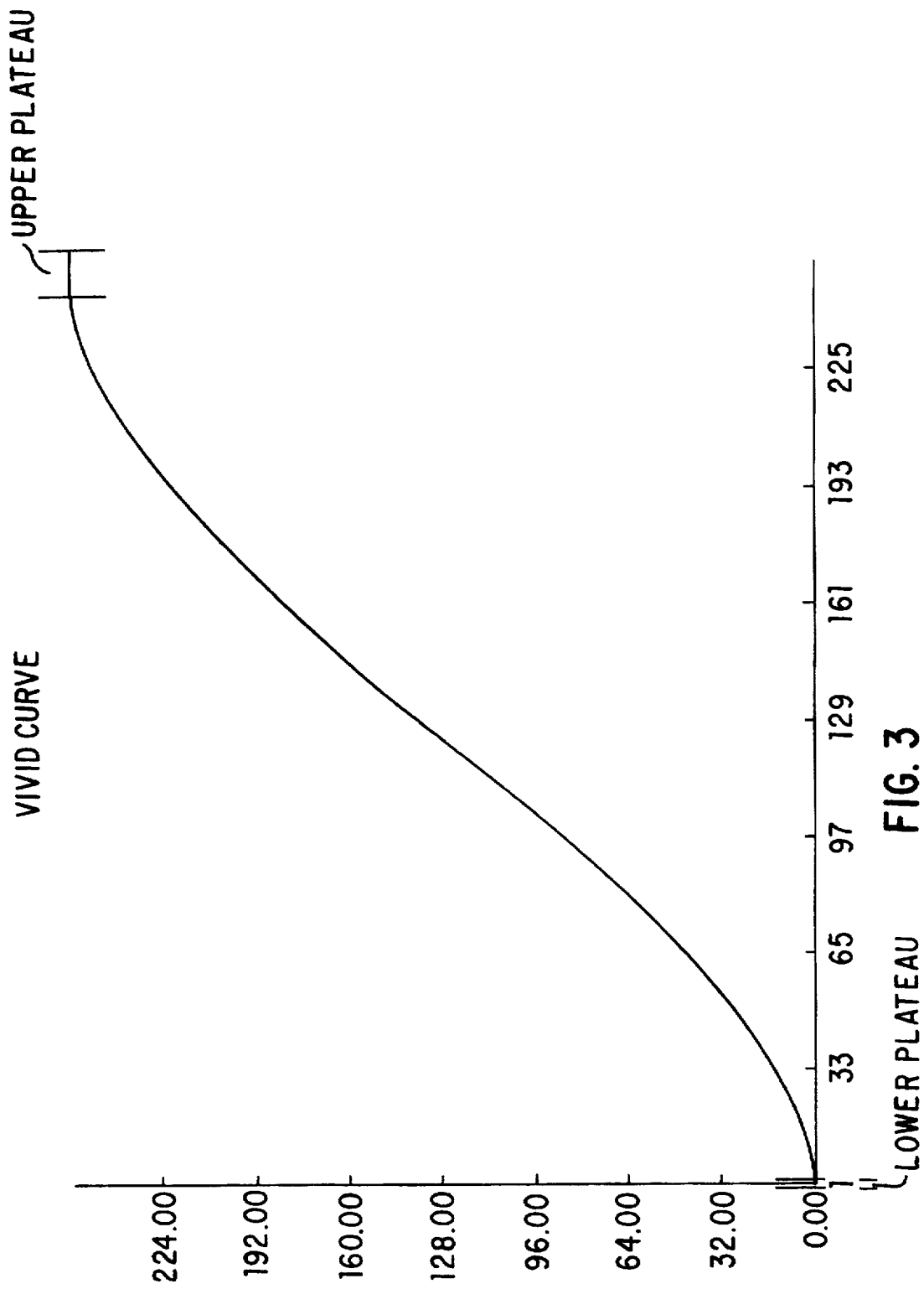
FIG. 3 shows a vivid-response curve in accordance with this invention.

As shown in FIG. 3, the vivid-response curve has an S shape with a plateau both at the top and the bottom. The vivid-response curve is applied independently to the red, green, and blue channels or dimensions of the input image data. While this vivid-response curve correction is applied to the three color channels, red, green, and blue, it is considered a "one-dimensional color correction," because it is applied to each color dimension independently. This is in contrast to the conventional "three-dimensional" approach which considers all three color dimensions simultaneously when color matching in each dimension.

Applying the vivid-response curve of FIG. 3 stretches the midtones of an image while compressing the highlight and shadow detail. This causes the colors to become more vivid. For example, consider an off-yellow which would have high values for red and green, and a low value for blue. Applying the vivid-response curve, the red and green values would be increased, while the blue value would be reduced. This results in more vividness and more contrast and as a result a sharper appearance. The plateau at the top of the vivid-response curve also causes "snapping to primaries," i.e., values close to 255 (on a 0–255 intensity scale) become 255. Thus, slightly-off white becomes true white and color triplets close to pure primary or secondary colors are pushed closer or all the way to those primary and secondary colors.

Figure 4:
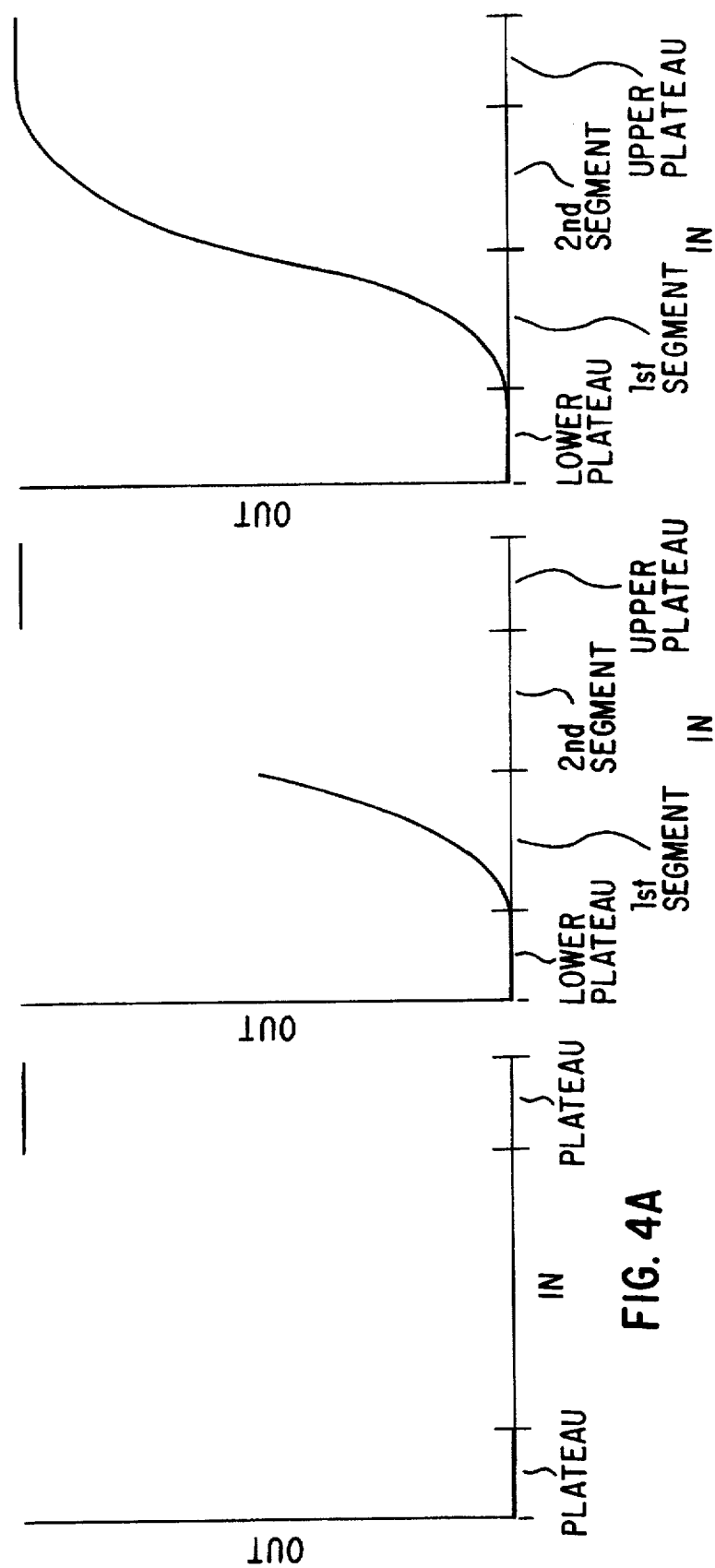
FIG. 4 shows how a vivid-response curve $y(x,s,\gamma_1,h)$ is generated using a first gamma function.

This vivid-response curve is produced by obtaining the input range between the plateaus and cutting it in half. The first half of the range is a first gamma function, $f(x)=x^{\gamma_1}$ as shown in FIG. 4B. The second half of the range uses the same gamma function flipped over upward, and flipped over to the right. As a result, the three parameters used to specify a particular vivid-response curve are the lower plateau limit s, the first gamma value $\gamma_1$ that specifies the degree of "S" shape, and the upper plateau limit h.

The vivid-response function $y(x, s, \gamma_1, h)$ where $F=255$, $H=127.5$, and $m=\tfrac{1}{2}(h-s)$, is as follows.

$$y = \underline{H} \cdot \left( \frac{x - \underline{s}}{\underline{m}} \right)^{\gamma_1} \text{ if } \underline{x} < \underline{s} + \underline{m}, \text{ and}$$

$$y = \underline{F} - \underline{H} \cdot \left( \frac{h - x}{\underline{m}} \right)^{\gamma_1} \text{ otherwise}$$

Figure 6:
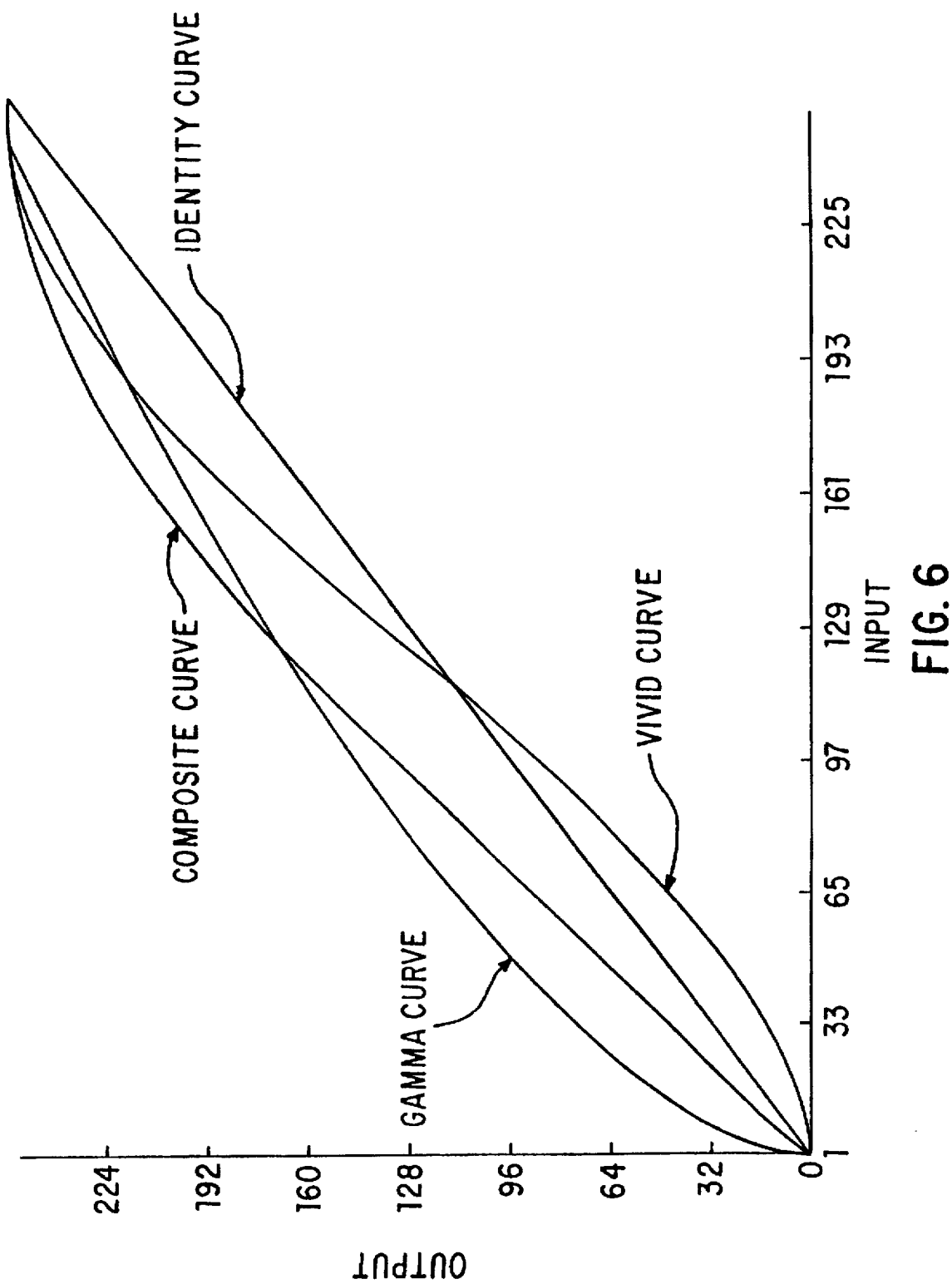
FIG. 6 shows a composite function $z(y,\gamma_2)$ of the vivid-response curve and the second gamma function.

The second gamma function $z(y, \gamma_2)$—which is to say, with the result y of the first function inserted in lieu of x as an argument of the second function to form the "composite curve" in FIG. 6—is as follows.

$$\underline{z} = \underline{F} \cdot \left( \frac{y}{\underline{F}} \right)^{\gamma_2}$$

For example, values for $(s, \gamma_1, h)$ of $(0, 1.6, 245)$ work well on the Hewlett-Packard DeskJet 1200C and 1600C color inkjet printers, making $m = 245/2 = 122\tfrac{1}{2}$.

Figure 5:
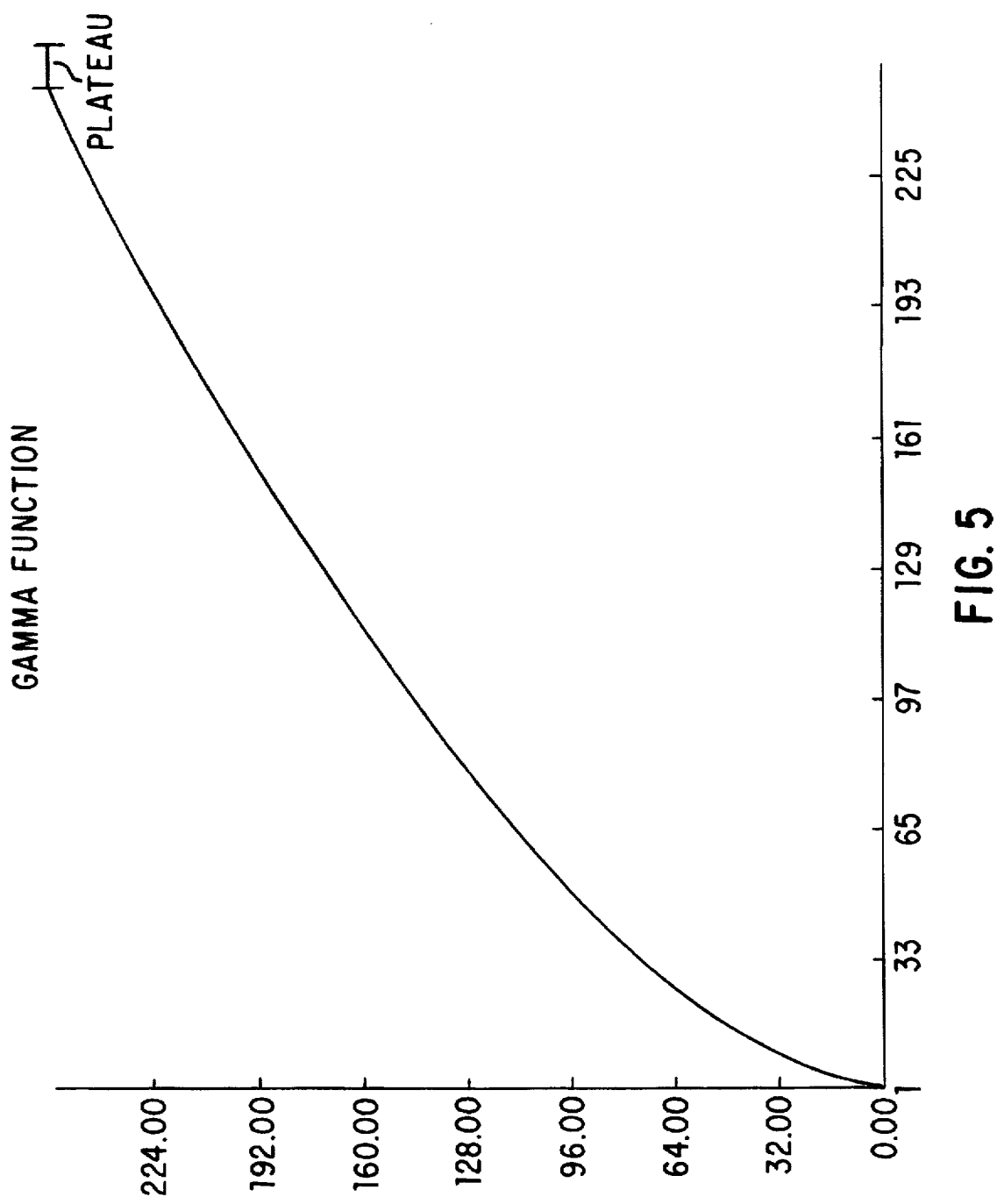
FIG. 5 shows a second gamma function $z(x,\gamma_2)$.

For a printer with well-behaved inks like the Hewlett-Packard DeskJet 1200C and DeskJet 1600C color inkjet printers, this one-dimensional color correction produces excellent printed color output when combined with a second gamma function (also a one-dimensional color correction) that lightens the output. As shown in FIG. 5, this second gamma function-graphed here as a noncomposite function $z(x,\gamma_2)$ of x rather than y—pushes all values up (with $\gamma_2<1.0$), thus lightening the image. The curves of FIGS. 5 and 6 were developed, as can be verified from the data as graphed, using a second gamma value $\gamma_2=0.6$. Combining the vivid-response curve with the second gamma curve produces an attractive image that is actually preferred over an accurate color match. Furthermore, computationally, this processing is much faster than using a traditional three-dimensional color-lookup table.

A second aspect of the present invention involves incorporating these vivid-response curves into the dither cell. U.S. patent application Ser. No. 08/308,321, entitled SYSTEM AND METHOD FOR GENERATING CALIBRATED DITHER MATRICES, filed Sep. 19, 1994, discloses the use of a measured tonal-response curve in producing a histogram for a blue-noise dither cell that results in visually linear output. This is accomplished by using the measured tonal response to determine how many incremental dots to turn on at each level in the dither mask. This is in lieu of turning on a constant number of dots at each level. The motivation for this is to aid the color matching by making the output device more linear.

The present invention improves upon U.S. patent application Ser. No. 08/308,321 entitled SYSTEM AND METHOD FOR GENERATING CALIBRATED DITHER MATRICES, filed Sep. 19, 1994. Much of the remainder of this present patent document is summarized from that earlier one, and from others of the previously mentioned patent documents incorporated herein by reference, particularly the document relating to printing by symbol modeling. For further understanding of symbol modeling, please refer to that document.

Figure 7:
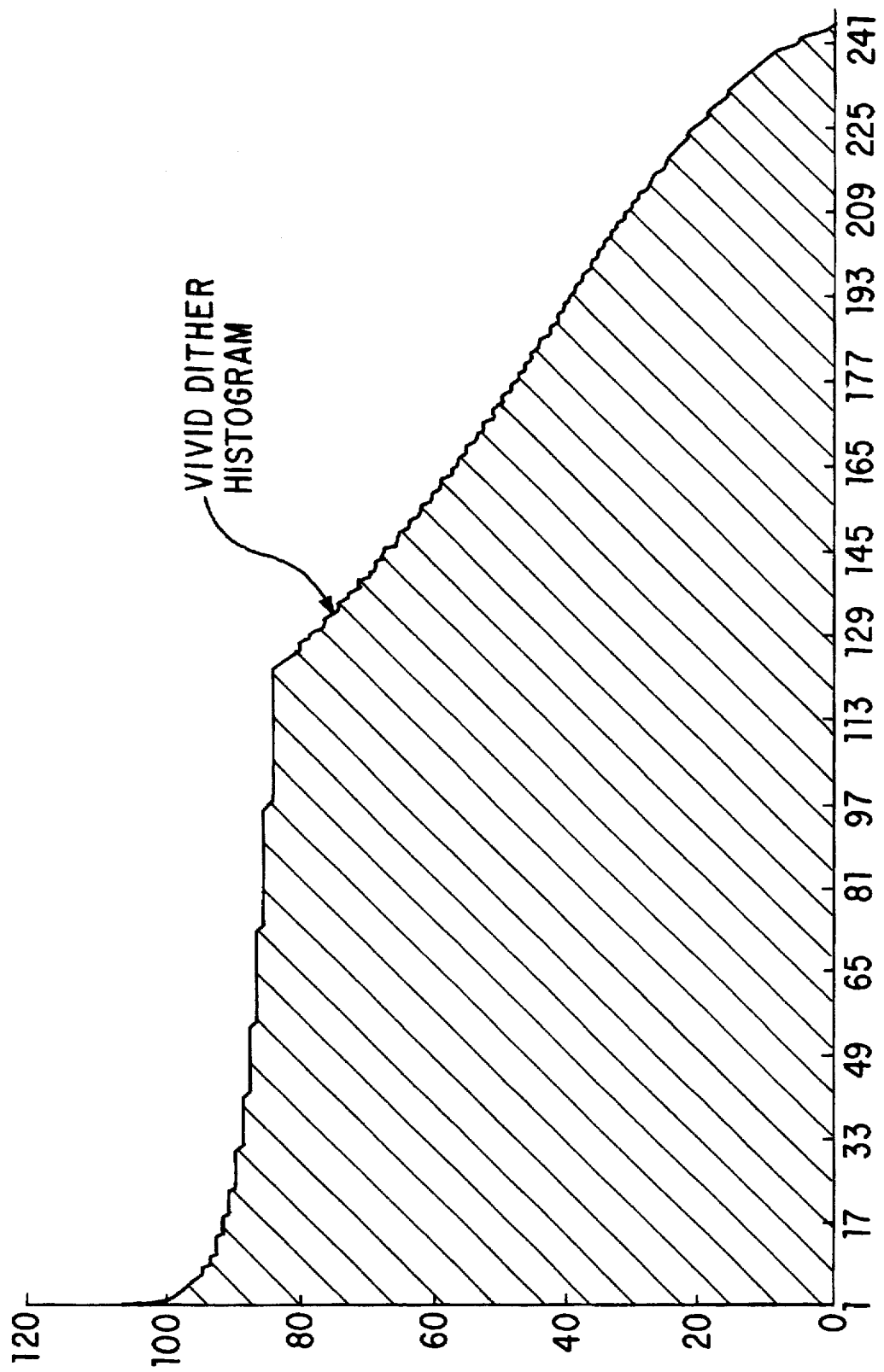
FIG. 7 shows a histogram of the dither of the present invention.

The present invention incorporates into the dither cell a composite function which is a concatenation of the vivid-response gamma function and a second gamma function. This composite function is shown in FIG. 6. By using this composite function it is possible to fabricate a dither (blue-noise or conventional dither), that incorporates all of the color correction within it. This composite function is used to determine how many dots to turn on at each level. This dither differs from a normal dither in that its histogram (the number of dots turned on at each level) reflects the composite function rather than a uniform number of dots. FIG. 7 shows a typical histogram for the dither matrix of the present invention.

Results indicate that for an inkjet printer with well-balanced cyan, magenta, and yellow inks, halftoning with the new matrix alone can produce vivid color images without the need of doing additional color correction. With the resultant "vivid dither" matrix, all color correction is contained within the halftone dither cell. Since all of the additional processing is off-line in the construction of the dither cell, there is no increase in processing time over matched color output. This can significantly reduce the amount of processing time involved in color-table interpolation.

Suppose the input optimization curve is f(x), and the histogram of the original matrix is g(x), then the new matrix threshold can be obtained from the mapping:

$$x_n=f^{-1}(x).$$

Therefore $$x=f(x_n),$$

and the cumulative histogram of the original matrix is—

$$c(x)=g(x)dx.$$

After the mapping, the cumulative histogram of the new matrix is—

$$c_n(x)=g(f(x_n))d(f(x_n)),$$

and with some simple mathematics one obtains the new cumulative histogram as $$c_n(x)=g(f(x))f'(x)dx.$$

If the histogram of the original matrix is uniform, i.e. $g(x)=K$, a constant, then the new cumulative histogram is $c_n(x)=Kf(x)$. Hence, the new cumulative histogram is proportional to the optimization curve.

The above analysis clarifies the relationship between the mapping and the histogram of the new matrix. In practical implementation, one can start with generating a matrix that has a uniform histogram. One can then obtain the optimization curve either through measurement or through image analysis. After that, one can derive the new histogram from the optimization curve, and generate a dither matrix with that cumulative histogram.

In case one needs to do further adjustment of the tonal response, one can repeat the process to obtain the optimization curve; however, the matrix no longer has a uniform histogram. One can perform the threshold mapping first to obtain a new threshold matrix. The new matrix will have fewer gray levels since many levels are lost in the mapping process due to quantization errors. To make up for the lost levels, one can then calculate the cumulative histogram of the mapped matrix, smooth out the discrete steps, and generate a new strictly monotonic cumulative histogram. This new histogram is input to the matrix generation program to generate the final matrix.

The calibrated dither matrix is generated by inputting the cumulative histogram to the dither-matrix generation program 107 to generate a dither matrix based on the cumulative histogram.

Figure 8:
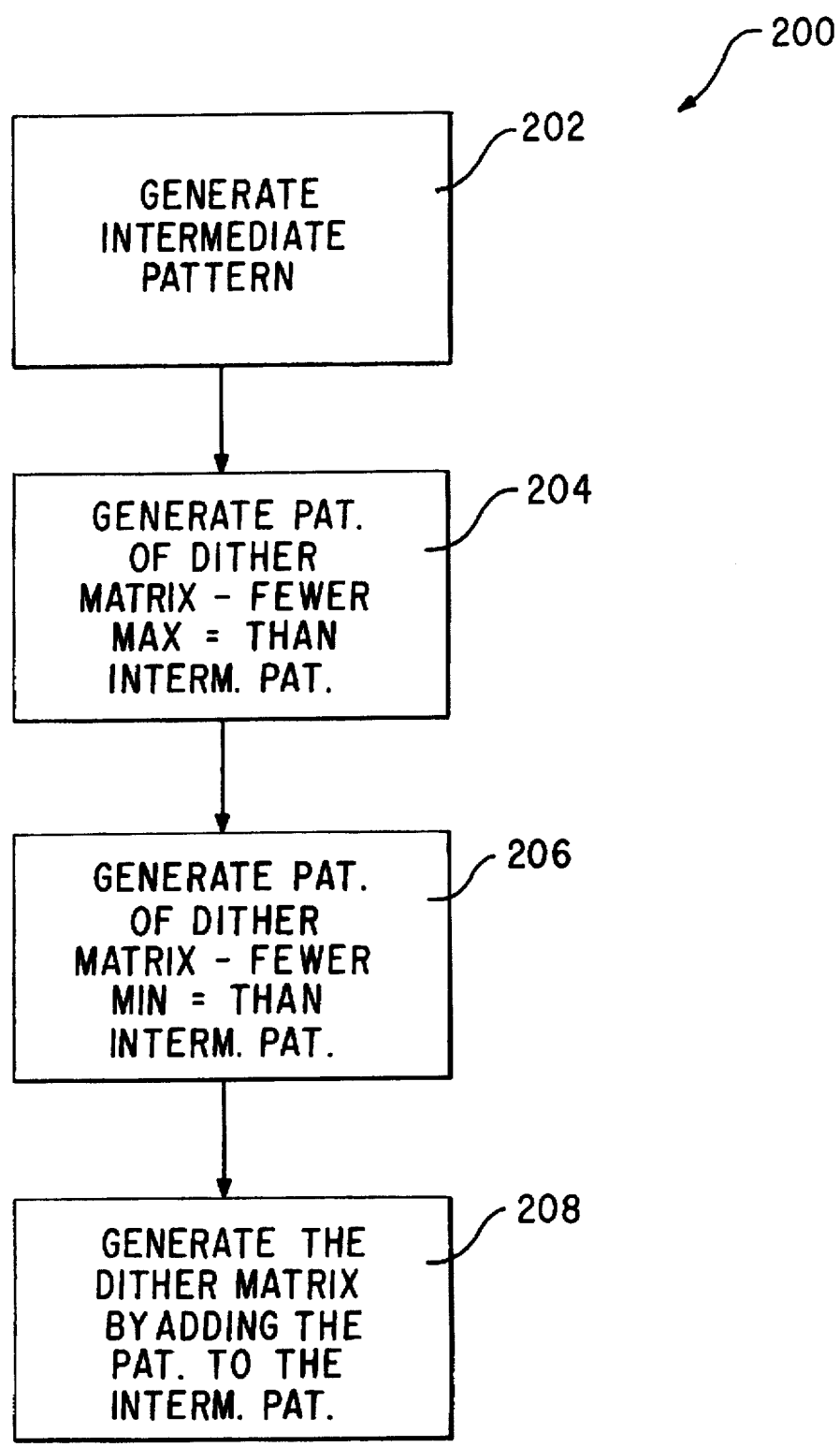
FIG. 8 shows the preferred steps to generate a dither matrix of the present invention.

FIG. 8 shows the steps 200 to generate the dither matrix 110. The first step, 202, is to generate an intermediate pattern with elements having values of either one or zero. The elements with ones are substantially uniformly distributed within the pattern. The values of the elements are dependent on the model of the symbols (for explanation see previously mentioned patent document on that topic).

Figure 9:
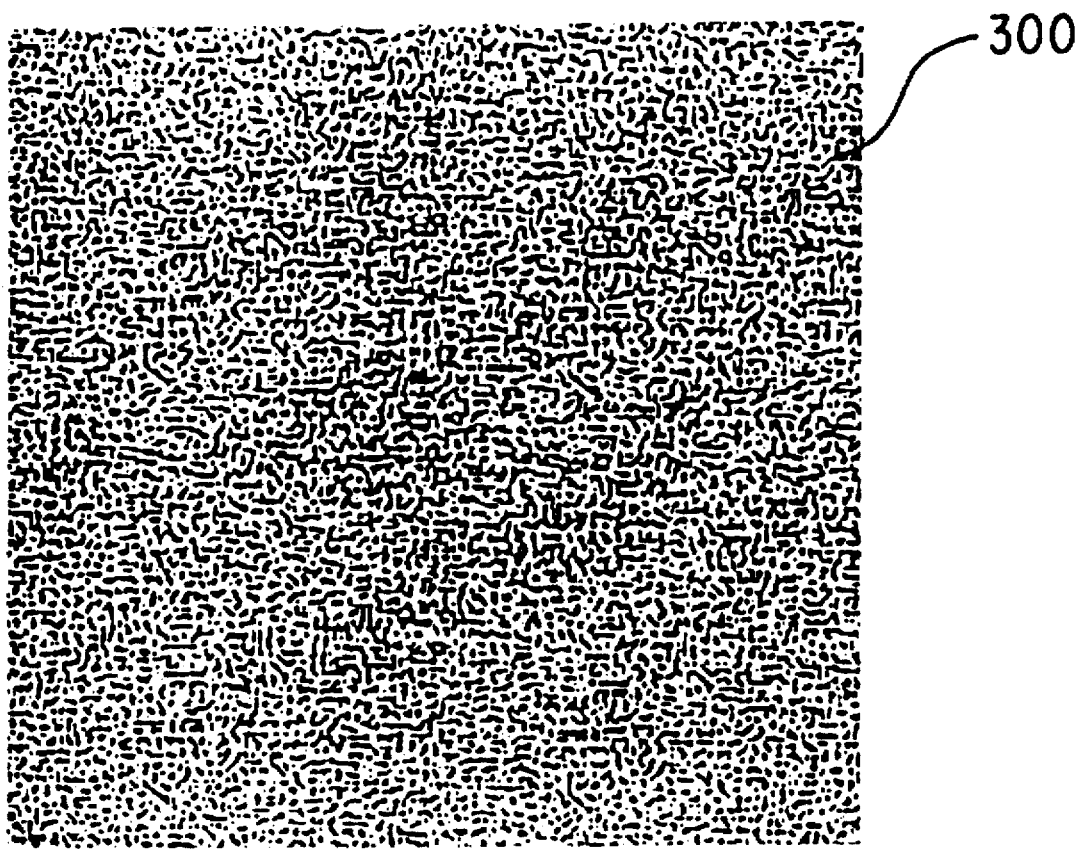
FIG. 9 shows an example of an intermediate pattern of the present invention.

FIG. 9 shows an example of an intermediate pattern 300, with 128 rows by 128 columns of elements. The pattern shown in FIG. 9 was printed by a 600 dpi printer and enhanced by magnifying it nine times, with the image duplicated four times, once along the horizontal direction, and then along the vertical direction. A symbol output implies that the element at that position has a value of one, and a void implies that the element at that position has a value of zero.

In the second step, 204, patterns of the dither matrix 110 with fewer elements having ones than the intermediate pattern 300 are generated. This is done through modifying the values of the elements by the model of the symbols and through replacing a plurality of ones with zeros from the intermediate pattern 300. The ones to be replaced are in regions with elements having ones clustered together as identified by a filter. The difference in the number of elements having ones from one pattern to its next pattern is dependent on a quantization number.

In the third step, 206, patterns of the dither matrix 110 with fewer zeros than the intermediate pattern 300 are generated. This is done through modifying the values of the elements, once again by the model of the symbols, and through replacing a plurality of zeros with ones from the intermediate pattern 300. The zeros to be replaced are in regions with elements having zeros clustered together as identified by the filter. The difference in the number of elements having zeros from one pattern to its next pattern is dependent on the quantization number.

Finally, in step four, 208, the dither matrix, 110, is formed by adding all the patterns to the intermediate pattern.

Steps two to four are not restricted to that sequence. Step three, 206, can be done before step two 204. Step four, 208, the summing step, can be performed as the patterns are generated. For example, after the formation of the intermediate pattern, the pattern is copied to the dither matrix. Then, as each additional pattern is generated, it is added to the dither matrix by matrix addition. So, when all the patterns are generated, the dither matrix 110 is also formed.

In the present example, the dither matrix, 110, has 128 rows by 128 columns of elements, and the gray-scale image, 102, has 256 levels of lightness, including the two end levels, the level with no symbols and the level entirely covered with symbols. The levels of lightness determine the number of patterns for the dither matrix, 110. In one preferred embodiment, the total number of patterns including the intermediate pattern is 256. The difference in the number of elements having values equal to one between a pattern and its next pattern is dependent on the quantization number. For the purpose of generating a dither matrix which conforms to a cumulative histogram, the quantization number depends on the histogram and is defined as the increment in value of the histogram between successive tone level values.

Figure 10:
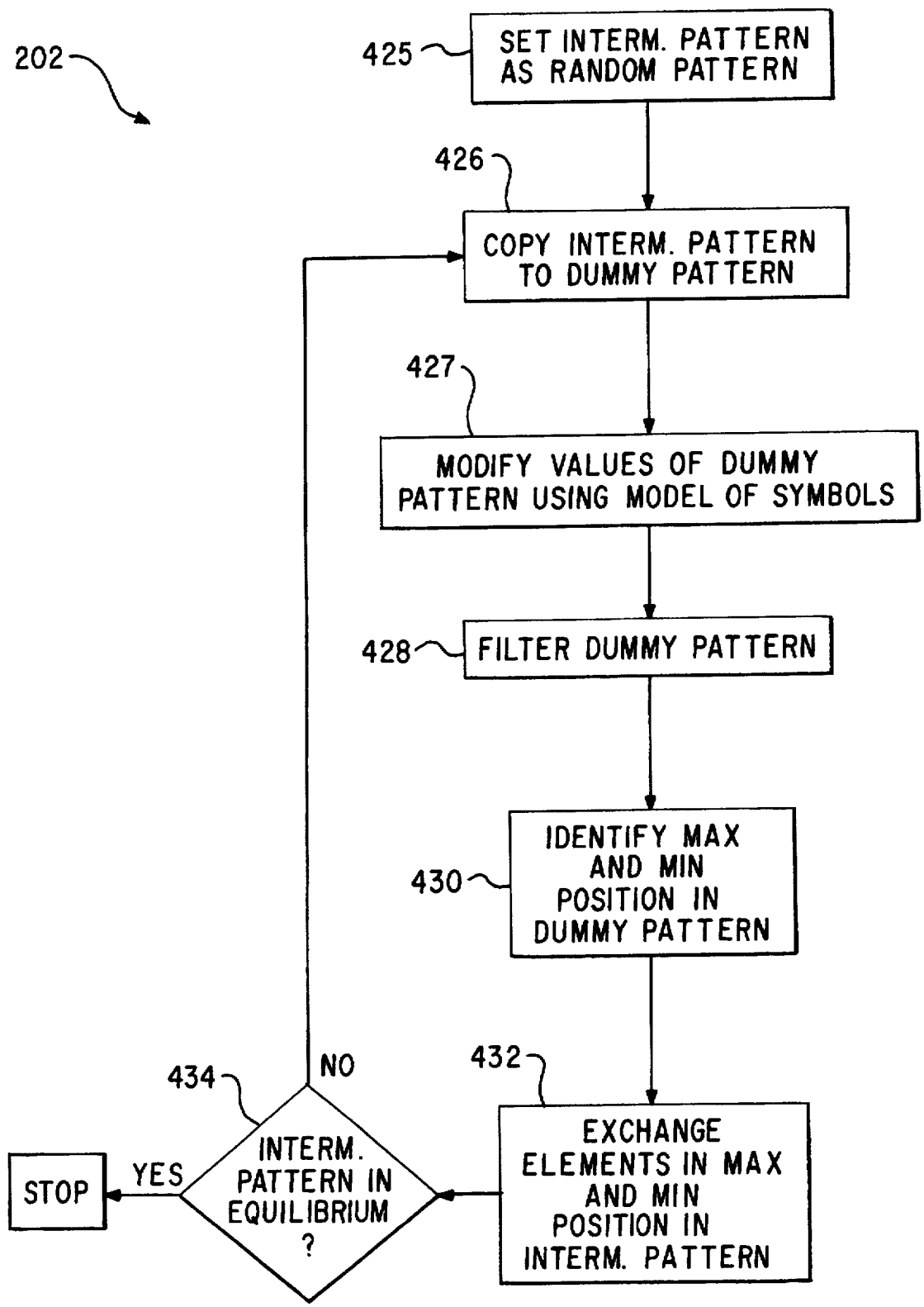
FIG. 10 describes the step of generating the intermediate pattern in greater detail.

FIG. 10 describes the step, 202, of generating the intermediate pattern 300, in more detail. The intermediate pattern is set, 425, to be a random pattern, with ones and zeros randomly distributed. Preferably, a fraction of at least 100/255 of the elements in the random pattern has values equal to one; and at least the same fraction 100/255 has values equal to zero. Then, the intermediate pattern 300 is copied to a dummy pattern, 426, and the values of the elements in the dummy pattern are modified, 427, by the model of the symbols. Another preferred method for modifying the values of the elements is to find the probability of having toner particles as a function of position. Some printers, such as laser printers, uses toner particles to generate a symbol. In one embodiment, the optical beam to generate the toner particles is Gaussian in shape, and accordingly one preferred probability of having toner particles follows a Gaussian shape. Modification of the values of the elements of the dummy pattern using the model of the symbols and using the probability of having toner particles as a function of position is described in greater detail in the copending patent application entitled "HALFTONE IMAGES USING PRINTED SYMBOLS MODELLING".

Referring back to FIG. 10, after the values of the elements in the dummy pattern have been modified 427, the next step is to pass the dummy pattern through the filter. One preferred filter is described in U.S. Pat. No. 5,317,418, which is incorporated herein by reference. The dummy pattern is duplicated two dimensionally before it is filtered. This is known as circular convolution. For the modified dummy pattern, with subelements and bit maps, the filter has to sample more frequently, such as at every subelement or at every bit. The filtering process will not be described in this application. A general discussion on this type of spatial filtering can be found in *Discrete Time Signal Processing*, written by A. V. Opponheim and R. W. Schafer, Prentice Hall, 1989.

The filtered output would have the largest value at the location where the ones are most clustered together, and the smallest value at the location where there is the largest void. The position with the largest value is identified, 430, as the maximum position, and the position with the smallest value is identified as the minimum position, 356. If there are locations that are equally clustered or voided, then there will be more than one maximum or minimum position. In one preferred embodiment, the first position found to be the maximum and having a value of one in its corresponding position in the intermediate pattern is selected to be the maximum position. Similarly, the first position found to be the minimum and having the value of zero in its corresponding position in the intermediate pattern is selected to be the minimum position.

After the maximum and minimum position are identified, 430, their elements in the intermediate pattern, 300, are exchanged, 432.

The intermediate pattern, 300, is then again copied to the dummy pattern to be modified by the model of the symbols and filtered. These steps are repeated numerous times, 434, until the intermediate pattern reaches an equilibrium state, such as the example shown in FIG. 9. At that point, the ones and the zeros are substantially uniformly distributed within the pattern.

Figure 11:
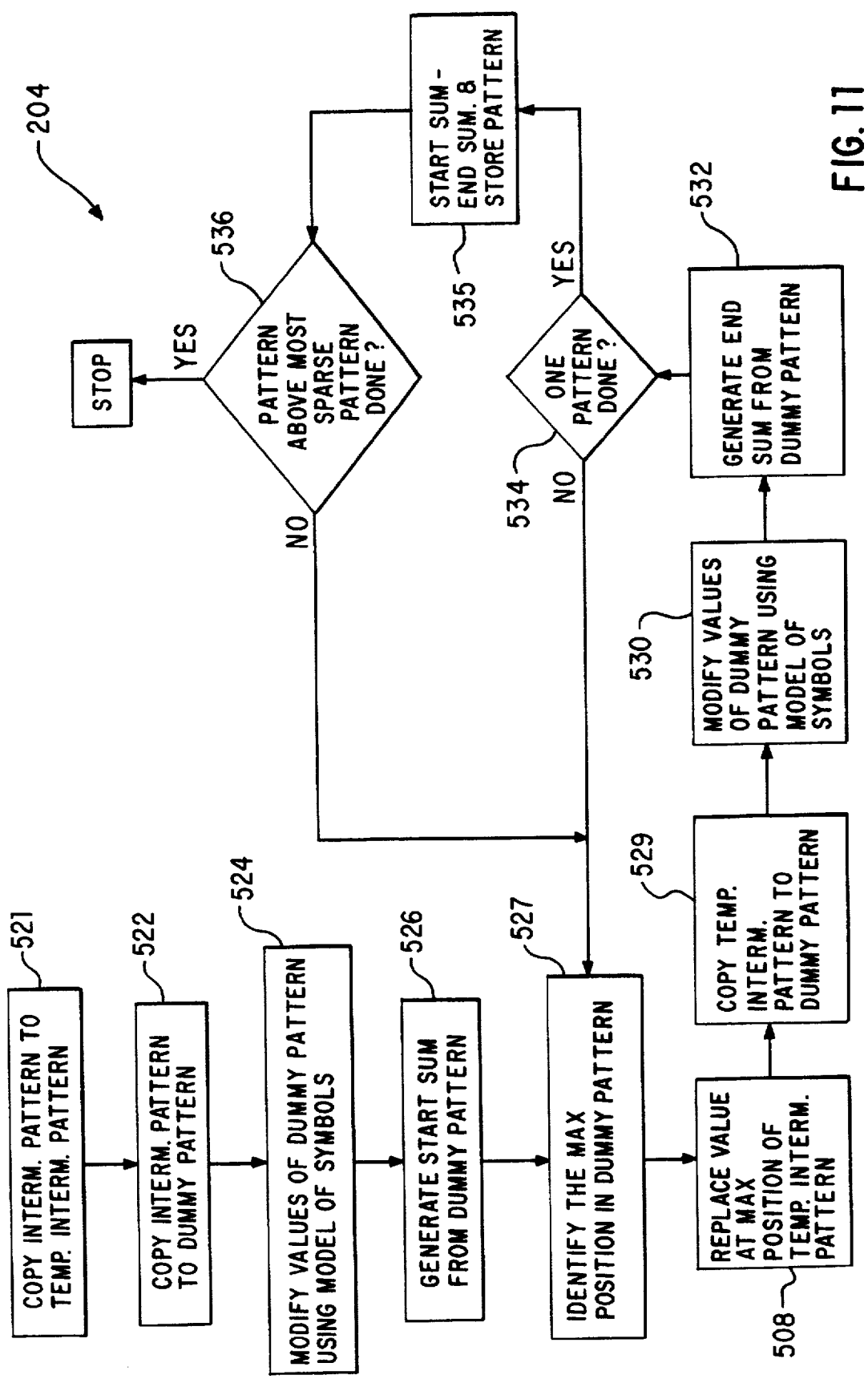
FIG. 11 describes the steps of generating patterns of the dither matrix of the present invention with fewer ones than the intermediate pattern.

The dither matrix requires one or more patterns with elements having fewer ones. FIG. 11 describes the step, 204, of generating patterns of the dither matrix 110 with fewer ones than the intermediate pattern in more detail.

In generating the many patterns with fewer ones, first, the intermediate pattern, 300, is copied, 521, to a temporary-intermediate pattern, and is also copied, 522, into a dummy pattern. Then, the values of the elements in the dummy pattern are modified, 524, by the model of the symbols as described above, and a start sum is generated, 526.

In one embodiment, the start sum is equal to the sum of the values of the modified pattern. The way to calculate the tone reflectance from the coverage of the symbols on the pattern by the Yule-Nielsen equation is as described above. The dummy pattern is then filtered to identify, 527, the position of the dummy pattern where ones are substantially most clustered as the maximum position. The identification step is similar to the methods described above by the normalized Gaussian filter with a sigma of 1.5 and will not be further described here. The value of the element in the maximum position of the temporary-intermediate pattern is replaced, 528, with a zero.

Then, the values of the temporary-intermediate pattern are copied, 529, to the dummy pattern. The dummy pattern is again modified by the model of the symbols, 530, and an end sum is generated, 532. The end sum is generated the same way as the start sum.

The invented method then goes back, 534, to the "identify" step 527 until the difference between the start sum and end sum is less than or equal to the quantization number to generate one pattern of the dither matrix. The start sum then is set, 535, to be the end sum, and the generated pattern is stored in the computer 100. The quantization number is determined from the cumulative histogram.

The method then again goes back, 536, to the "identify" step 527, until the end sum is less than or equal to the quantization number to generate numerous patterns of the dither matrix 110 with fewer ones. The method will stop when the pattern above the most sparse pattern is generated because the most sparse pattern is the pattern with no symbols.

Figure 12:
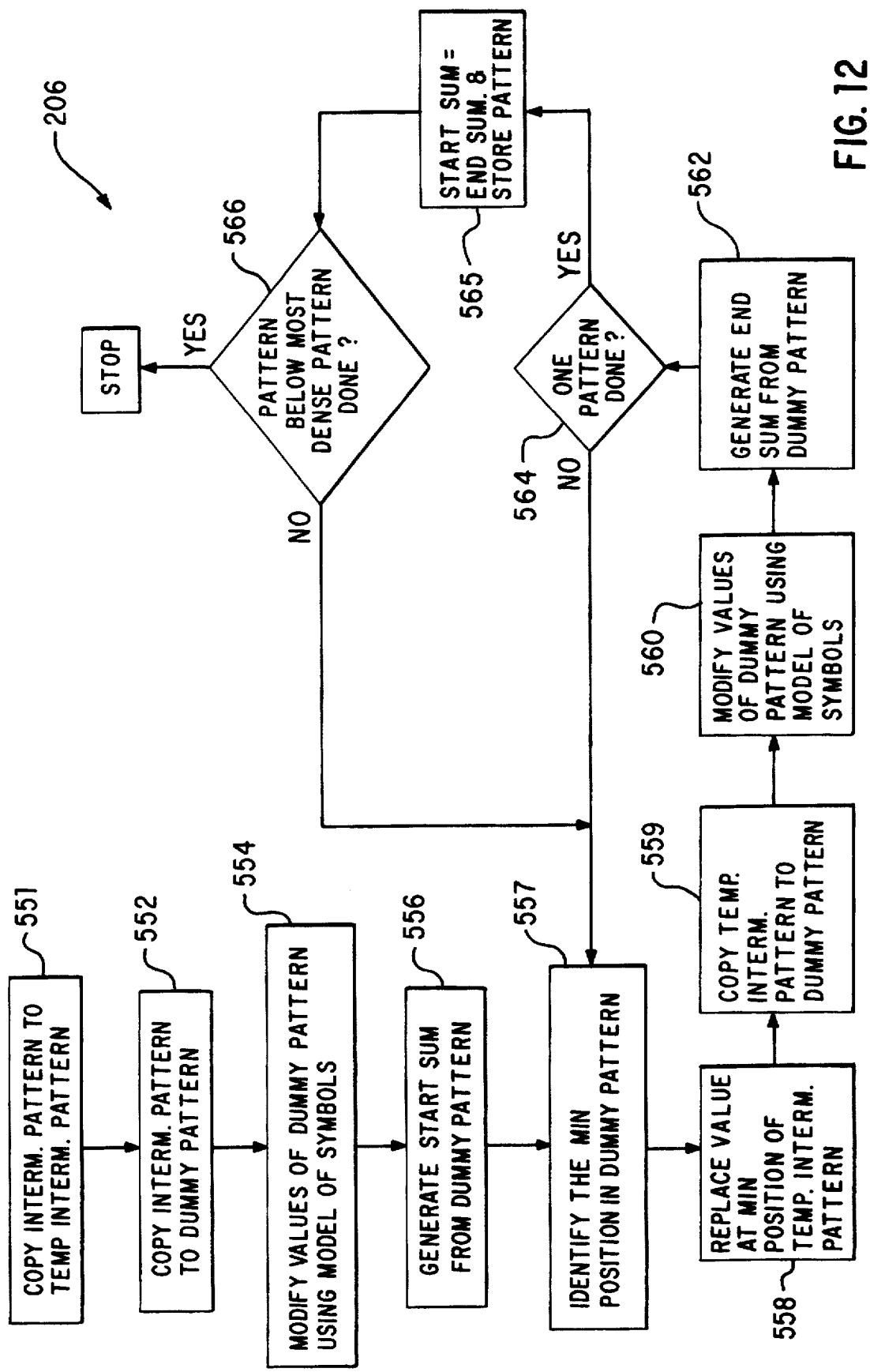
FIG. 12 describes the steps of generating patterns of the dither matrix of the present invention with fewer zeros than the intermediate pattern.

The dither matrix 110 also requires one or more patterns with fewer zeros. FIG. 12 describes the step, 206, of generating patterns of the dither matrix 110 with fewer zeros than the intermediate pattern in more detail. The steps shown in FIG. 12 are similar to the steps shown in FIG. 11. First, the intermediate pattern is copied, 551, into a temporary-intermediate pattern, and is also copied, 552, into a dummy pattern. Then, the values of the elements in the dummy pattern are modified, 554, by the model of the symbols. After the modification, a start sum is generated, 556. The element in the position of the dummy pattern where elements with zeros are substantially most clustered together is identified, 557, to be the minimum position. The element in the minimum position of the temporary-intermediate pattern is replaced, 558, with a one. After that, the temporary-intermediate pattern is copied, 559, to the dummy pattern, and the values of the elements in the dummy pattern are modified, 560, by the model of the symbols and an end sum is generated, 562. The above steps are repeated, 564, from the "identify" step, 557, until the difference between the start sum and end sum is less than or equal to the quantization number to generate one pattern of the dither matrix. At that point, the start sum is set, 565, to be the end sum, and the generated pattern is stored in the computer 100. Finally, the above steps are repeated from the "identify" step, 557, until the end sum is greater than or equal to:

$$\left( \frac{\text{the total number of}}{\text{patterns of the dither matrix}} - 1 \right) \cdot (\text{the quantization number}),$$

to generate numerous patterns for the dither matrix. Note that the total number of patterns is 256 in the present example. The method will stop when the pattern below the most dense pattern is generated because the most dense pattern is the pattern totally filled with symbols.

It should be understood that the foregoing description is only illustrative of the invention. Various alternatives and modifications can be devised by those skilled in the art without departing from the invention. In addition, while the invention has been described with respect to a color inkjet printer, it is equally applicable to other color output apparatus which is required to perform a color transformation. Accordingly, the present invention is intended to embrace all such alternatives, modifications and variances which fall within the scope of the appended claims.

What is claimed is:

1. A method of generating a dither matrix incorporating a desired vivid response, for use in a thermal-inkjet printer; said method comprising:

generating a dither matrix with a predicted vivid response close to the desired vivid response;

said generating step comprising incorporation into the dither matrix of a generally S-shaped response curve that provides a vivid response;

measuring actual response;

manipulating a cumulative histogram for said dither matrix in response to said actual response; and inputting said cumulative histogram to a dither generation program to generate a dither matrix that conforms to said cumulative histogram.

2. The method of claim 1, wherein:

the generally S-shaped response curve comprises two sections blended together at a generally central point;

each of the two sections is defined by a respective function having a respective argument that is proportional to an input color signal; and each said function comprises raising its respective argument to a power greater than unity.

3. The method of claim 2, wherein:

each said argument is a fraction substantially equal to a range-normalized version of the input color signal.

4. The method of claim 1, wherein:

the response further incorporates a second function that in general lightens the response of the first-mentioned function.

5. The method of claim 4, wherein:

an argument of the second function is proportional to the first-mentioned function.

6. The method of claim 5, wherein:

the second function comprises raising the argument of the second function to a power smaller than unity.

7. The method of claim 6, wherein:

the argument of the second function is a range-normalized version of the first-mentioned function.

8. The method of claim 2, wherein:

the response further incorporates a second function that in general lightens the response of the first-mentioned function;

an argument of the second function is proportional to the first-mentioned function; and the second function comprises raising the argument of the second function to a power smaller than unity.

9. A method of reproducing a multilevel plural-color input image, comprising:

applying to the image a dither matrix that incorporates a vivid response function, to obtain, for each of plural output colors, a bit plane having fewer levels than the input image; and printing the image using the obtained bit planes; and wherein the response further incorporates a second function that in general lightens the response of the first-mentioned function.

10. The method of claim 9, wherein:

an argument of the second function is proportional to the first-mentioned function.

11. The method of claim 10, wherein:

the second function comprises raising the argument of the second function to a power smaller than unity.

12. The method of claim 11, wherein:

the argument of the second function is a range-normalized version of the first-mentioned function.

13. The method of claim 11, wherein:

the response further incorporates a second function that in general lightens the response of the first-mentioned function;

an argument of the second function is proportional to the first-mentioned function; and the second function comprises raising the argument of the second function to a power smaller than unity.

14. A method of reproducing a multilevel plural-color input image, comprising:

applying to the image a dither matrix that incorporates a composite response function that includes:

a first response function having two separate sections blended together at a general middle point, to obtain, for each of plural output colors, a bit plane having fewer levels than the input image, said separate sections of the response function having generally opposite trends, respectively, and a second response function having a general trend that opposes the trend of one of said two separate sections and reenforces the trend of the other of said two separate sections; and printing the plural-color image using the obtained bit planes.

15. The method of claim 14, wherein, when presented as curves on a linear graph, the trend of:

a first of the two sections of the first response function appears upward concave;

a second of the two sections of the first response function appears upward convex; and the second response function appears upward convex.

16. The method of claim 15, wherein:

each section of the first response function comprises raising a fractional argument to a power greater than unity; and the second response function comprises raising the first response function to a power smaller than unity.

17. The method of claim 16, wherein:

the second section of the first response function comprises substracting, from substantially a maximum output value, the arithmetic result of raising said fractional argument to a power greater than unity.

18. The method of claim 16, wherein:

the first response function y, given that F and H are the full-scale and half-scale values of the output range, h and s are the highest and lowest input-range values for which the function is defined, and the input midrange value is m=½(h-s), is:

$$\underline{y} = \underline{H} \cdot \left( \frac{\underline{x} - \underline{s}}{\underline{m}} \right)^{r_1} \text{ if } \underline{x} < \underline{s} + \underline{m}, \text{ and}$$

$$\underline{y} = \underline{F} - \underline{H} \cdot \left( \frac{\underline{h} - \underline{x}}{\underline{m}} \right)^{r_1} \text{ otherwise; and}$$

the second response function z is:

$$\underline{z} = \underline{F} \cdot \left( \frac{\underline{y}}{\underline{F}} \right)^{r_2}.$$

* * * * *